(12) United States Patent
Madan et al.

(10) Patent No.: US 10,291,578 B2
(45) Date of Patent: May 14, 2019

(54) METHOD TO DISTRIBUTE A CENTRALIZED SERVICE

(71) Applicant: Aruba Networks Inc., Sunnyvale, CA (US)

(72) Inventors: Amit Madan, Bangalore (IN); Naveen Manjunath, Bangalore (IN); Prateek Kapoor, Bangalore (IN); Santashil PalChaudhuri, Bangalore (IN)

(73) Assignee: Hewlett Packard Enierprise Development LP, Houston, TX (US)

( * ) Notice: Subject to any disclaimer, the term of this patent is extended or adjusted under 35 U.S.C. 154(b) by 142 days.

(21) Appl. No.: 14/524,528

(22) Filed: Oct. 27, 2014

(65) Prior Publication Data

US 2016/0119278 A1    Apr. 28, 2016

(51) Int. Cl.
*H04L 29/12* (2006.01)

(52) U.S. Cl.
CPC ...... *H04L 61/2007* (2013.01); *H04L 61/2015* (2013.01); *H04L 61/2046* (2013.01); *H04L 61/6068* (2013.01); *H04L 61/2514* (2013.01)

(58) Field of Classification Search
USPC ........................................................ 709/245
See application file for complete search history.

(56) References Cited

U.S. PATENT DOCUMENTS

| | | | | |
|---|---|---|---|---|
| 7,970,938 | B1 * | 6/2011 | Lambeth | H04L 41/12 709/206 |
| 8,547,826 | B2 * | 10/2013 | Nomura | H04L 29/12264 370/216 |
| 2006/0146870 | A1 * | 7/2006 | Harvey | H04L 29/12009 370/466 |
| 2006/0161661 | A1 * | 7/2006 | Johnson | H04L 29/12273 709/226 |
| 2007/0097993 | A1 * | 5/2007 | Bojahra | H04L 41/00 370/401 |
| 2008/0101353 | A1 * | 5/2008 | Streijl | H04L 29/12283 370/389 |
| 2011/0238793 | A1 * | 9/2011 | Bedare | H04L 45/586 709/220 |
| 2014/0254373 | A1 * | 9/2014 | Varma | H04W 40/36 370/235 |

* cited by examiner

*Primary Examiner* — Hermon Asres
(74) *Attorney, Agent, or Firm* — Hewlett Packard Enterprise Patent Department (57) ABSTRACT

A network device may detect packets being transmitted on a network to obtain detected packets, identify Internet Protocol (IP) addresses corresponding to the detected packets, and identify candidate IP subnets that do not include any IP address in the IP addresses corresponding to the detected packets. A particular IP subnet may be selected from the set of candidate IP subnets for allocation to a set of target devices. A network device may identify a set of candidate Internet Protocol (IP) subnets, select a particular IP subnet from the set of candidate IP subnets, and transmit, to other network devices, an advertisement including an intent to use the particular IP subnet. Responsive to determining that none of the other network devices are using the particular IP subnet, the network device may select the particular IP subnet for allocating to a set of target devices.

20 Claims, 4 Drawing Sheets

METHOD TO DISTRIBUTE A CENTRALIZED SERVICE

BACKGROUND

Computer networks allow different computing systems, that are remote from each other, to communicate. Specifically, messages are passed between the different computing systems through the computer network. In order to pass messages, each computing system is provided with an internet protocol (IP) address. The IP address is typically assigned by a centralized server.

Overview

In general, in one aspect, embodiments relate to a non-transitory computer readable medium including instructions which, when executed by one or more hardware processors, cause performance of operations including detecting, by a network device, packets being transmitted on a network to obtain detected packets, identifying Internet Protocol (IP) addresses corresponding to the detected packets, and identifying candidate IP subnets that do not include any IP address in the IP addresses corresponding to the detected packets. The operations further include selecting a particular IP subnet from the set of candidate IP subnets for allocation to a set of target devices.

In general, in one aspect, embodiments relate to a non-transitory computer readable medium including instructions which, when executed by one or more hardware processors, cause performance of operations including identifying, by a network device, a set of candidate Internet Protocol (IP) subnets, selecting a particular IP subnet from the set of candidate IP subnets, and transmitting, by the network device to other network devices, an advertisement including an intent to use the particular IP subnet. The operations further include responsive to determining that none of the other network devices are using the particular IP subnet, selecting, by the network device, the particular IP subnet for allocating to a set of target devices.

In general, in one aspect, embodiments relate to a non-transitory computer readable medium including instructions which, when executed by one or more hardware processors, cause performance of operations including detecting, by each particular access point of multiple access points, packets being transmitted on a network to obtain detected packets, identifying, by each particular access point, Internet Protocol (IP) addresses corresponding to the detected packets, identifying, by each particular access point, a set of candidate IP subnets that do not include any IP address in the IP addresses corresponding to the detected packets. The operations further include selecting, by each particular access point, a respective IP subnet from the set of candidate IP subnets for allocation to a respective set of target devices associated with the particular access point.

In general, in one aspect, embodiments relate to a non-transitory computer readable medium including instructions which, when executed by one or more hardware processors, cause performance of operations including identifying, by each particular access point of multiple access points, a set of candidate IP subnets, selecting, by each particular access point, a respective IP subnet from the set of candidate IP subnets, and transmitting, by each particular access point to other access points, an advertisement including an intent to use the respective IP subnet. The operations further include responsive to determining that none of the other access points are using the respective IP subnet, selecting, by each particular access point, the respective IP subnet for allocating to a respective set of target devices associated with each particular access point.

Other aspects will be apparent from the following description and the appended claims.

BRIEF DESCRIPTION OF DRAWINGS

FIGS. 2, 3.1, and 3.2 show flowcharts in accordance with one or more embodiments.

FIGS. 4.1 and 4.2 show an example in accordance with one or more embodiments.

DETAILED DESCRIPTION

Specific embodiments will now be described in detail with reference to the accompanying figures. Like elements in the various figures are denoted by like reference numerals for consistency. In the figures, three co linear dots indicate that additional items of similar type to the preceding and succeeding items with respect to the dots may optionally exist.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, a user refers to a person, department, business entity, organization, or other group that is responsible for a device. For example, a user may own or lease a device. By way of some example users, a user may be an individual, a project development team, a family, a non-profit organization, or other type of user. Additionally, a user is deemed to perform an action when an individual, group, or hardware device performs an action on behalf of the user in one or more embodiments.

In general, embodiments provide a method, system, and computer readable medium for distributed assignment of internet protocol (IP) addresses in a private subnet. Specifically, in one or more embodiments, rather than having a single, centralized server that assigns IP addresses in the private network, the IP addresses are assigned by multiple network devices. Each of the multiple network devices identifies an IP subnet that does not have a conflict with respect to allocating IP addresses from the subnet, and allocates addresses from the subnet when no conflict exists.

Figure 1:
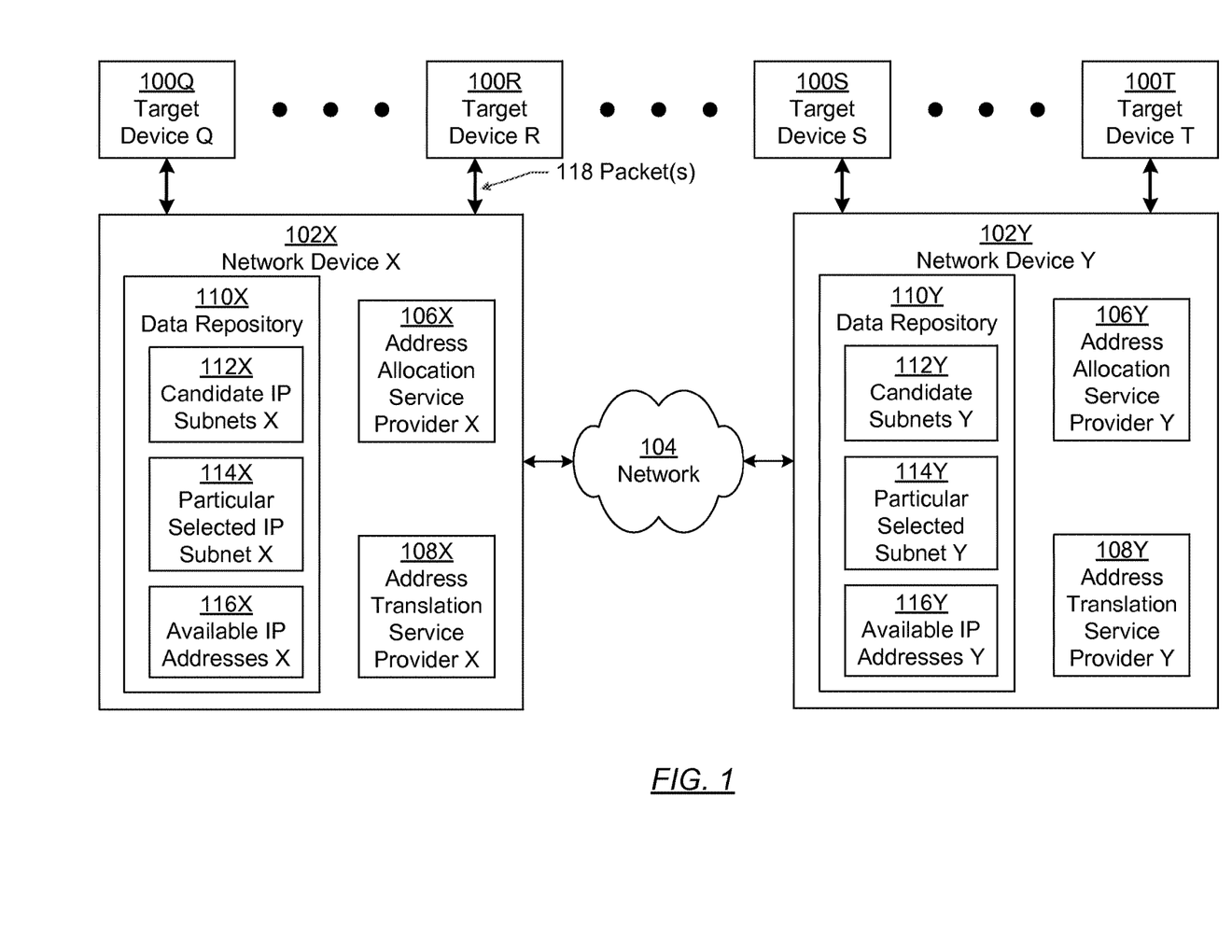
FIG. 1 shows a schematic diagram of a system in accordance with one or more embodiments.

FIG. 1 shows a schematic diagram of a system in accordance with one or more embodiments. As shown in FIG. 1, the system includes target devices (e.g., target device Q (100Q), target device R (100R), target device S (100S), target device T (100T)), network devices (e.g., network device X (102X), network device Y (102Y)), and a network (104). Each of these components is discussed below in accordance with one or more embodiments.

In one or more embodiments, a target device (e.g., target device Q (100Q), target device R (100R), target device S (100S), target device T (100T)) may be one or more mobile target devices (e.g., laptop computer, smart phone, personal digital assistant, tablet computer, or other mobile target device), gaming console, desktop computers, servers, blades in a server chassis, or any other type of electronic target device or target devices that includes at least the minimum processing power, memory, and input and output device(s) to perform one or more embodiments. For example, the target device may include one or more hardware processor(s), associated memory (e.g., random access memory (RAM), cache memory, flash memory, etc.), one or more storage target device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor. The target device may also include one or more input device(s), such as a touchscreen, keyboard, mouse, microphone, touchpad, electronic pen, or any other type of input device. Further, the target device may include one or more output device(s), such as a screen (e.g., a liquid crystal display (LCD), a plasma display, touchscreen, cathode ray tube (CRT) monitor, projector, or other display target device), a printer, external storage, or any other output device. One or more of the output device(s) may be the same or different from the input device(s). The input and output device(s) may be locally or remotely (e.g., via the network) connected to the hardware processor(s), memory, and storage target device(s). Many different types of target devices exist, and the aforementioned input and output device(s) may take other forms.

In one or more embodiments, a target device (e.g., target device Q (100Q), target device R (100R), target device S (100S), target device T (100T)) is a hardware component that is the target of an IP address. Specifically, the target device may send or receive communications in the form of packets (118) using the IP address that is allocated or assigned to the target device. In one or more embodiments, the target devices are in a single private network (104). The target devices may be each connected to single private network (104) via a network interface connection (not shown) and a network device (e.g., network device X (102X), network device Y (102Y)). Thus, the IP addresses assigned to the target device may be a private network IP address. For example, each target device may be allocated an IP address in one of three private IP address spaces including 10.0.0.0/8, 172.16.0.0/12, and 192.168.0.0/16. Although not shown in FIG. 1, the private network (104) may be connected to a public network, such as the Internet.

A network device (e.g., network device X (102X), network device Y (102Y)) is a digital hardware target device that may be communicatively coupled to the network (104). By way of an example, a target device may be directly wired or wirelessly communicatively connected to a single access point, which is directly communicatively connected to a single controller, which is connected to the network (e.g., network (104)). In the example, the network device may be the access point, the controller, an access point that includes the functionality of a controller, a switch (e.g., mobility access switch), or other such target devices. Additionally, by way of an example, one network device may be a controller while another network device may be an access point. The network device that is the access point in the example may or may not be connected to the network via the network device that is a controller.

An access point is a separate hardware unit from target device that is directly, wired or wirelessly, connected to the target device and is in a communication path from the target device to the network. In other words, the access point may be directly connected via the direct wired/wireless connection to a network interface card on the target device (e.g., target device Q (100Q), target device R (100R), target device S (100S), target device T (100T)). Further, access points may be directly connected to the network (104) or connected to the network (104) via a controller. By way of an example, the access point may include a wireless access point (WAP) that communicates wirelessly with target devices using Wi-Fi, Bluetooth or related standards and that communicates with a wired network.

Each network device may be connected to any number of target devices at any moment in time. Specifically, each network device may be connected to no target devices, a single target device, or multiple target devices at any particular moment in time. Further, the number of target devices connected to a network device may be heterogeneous amongst network devices.

In one or more embodiments, two or more of the network devices includes a data repository (e.g., data repository X (110X), data repository Y (110Y)), an address allocation service provider (e.g., address allocation service provider X (106X), address allocation service provider Y (106Y)) and an address translation service provider (e.g., address translation service provider X (108X), address translation service provider Y (108Y)).

In one or more embodiments, the data repository (e.g., data repository X (110X), data repository Y (110Y)) is any type of storage unit and/or device (e.g., a file system, database, collection of tables, or any other storage mechanism) for storing data. Further, the data repository may include multiple different storage units and/or devices. The data repository at a particular network device may be a local cache for a remote data repository, may be a temporary storage unit for data, or may consistently maintain data.

In one or more embodiments, the data in the data repository may include, for example, candidate IP subnets (e.g., candidate IP subnets X (112X), candidate IP subnets Y (112Y)), a particular selected IP subnet (e.g., particular selected IP subnet X (114X), particular selected IP subnets Y (114Y)), and available IP addresses (e.g., available IP addresses X (116X), available IP addresses Y (116Y)). The candidate IP subnets (e.g., candidate IP subnets X (112X), candidate IP subnets Y (112Y)) are IP subnets that do not conflict with IP subnets being used by other network devices. In particular, an IP subnet is a contiguous portion of the IP address space, and the candidate IP subnets are the contiguous portions that are available.

A particular selected IP subnet (e.g., particular selected IP subnet X (114X), particular selected IP subnets Y (114Y) is the unique IP subnet being currently used by the network device to allocate IP addresses to target devices. In one or more embodiments, the particular IP subnet is unique amongst all network devices in the private network. In one or more embodiments, available IP addresses (e.g., available IP addresses X (116X), available IP addresses Y (116Y)) are the IP addresses that are not allocated to target devices connected to the network device.

Although FIG. 1 shows a certain types of data that maintains the information, other techniques for storing the information may be used. For example, rather than or in addition to storing candidate IP subnets, a list of used IP subnets may be stored. Similarly, a list of used IP addresses may be stored.

The address allocation service provider (e.g., address allocation service provider X (106X), address allocation service provider Y (106Y)) includes functionality to select an IP subnet that does not conflict with IP subnets allocated by other devices and allocate IP addresses from the subnet. In one or more embodiments, selecting the IP subnet and allocating IP addresses is discussed below and in FIG. 2. In one or more embodiments, the address allocation service provider may be a dynamic host configuration protocol (DHCP) service provider. In such a scenario, the address allocation service provider is configured to implement DHCP.

In one or more embodiments, an address translation service provider (e.g., address translation service provider X (108X), address translation service provider Y (108Y)) includes functionality to translate private addresses into a public address. In particular, the private network may use IP addresses assigned in a private address space, where the IP addresses in the private address space are only unique within the private network and not globally unique. The address translation service includes functionality to translate between private IP address and a public IP address that may be used by multiple, and potentially all, target devices in the private network. Further, the address translation service includes functionality to modify the source IP address or destination IP address in each packet according to the translation. In one or more embodiments, performing address translation is discussed below and in FIG. 2. In one or more embodiments, the address translation service provider may be a network address translation (NAT) service provider. In such a scenario, the address translation service provider is configured to implement NAT processing for translations.

Although not shown in FIG. 1, software instructions in the form of computer readable program code to perform embodiments may be stored, in whole or in part, temporarily or permanently, on a non-transitory computer readable medium, such as a CD, DVD, storage target device, a diskette, a tape, flash memory, physical memory, or any other computer readable storage medium. Specifically, the software instructions may correspond to computer readable program code that when executed by a processor(s), is configured to perform embodiments. The aforementioned software instructions may be or may implement all or a part of the network device (e.g., network device X (102X), network device Y (102Y)) and/or another component.

While FIG. 1 shows a configuration of components, other configurations may be used without departing from the scope of the claims. For example, various components may be combined to create a single component. As another example, the functionality performed by a single component may be performed by two or more components.

Figure 2:
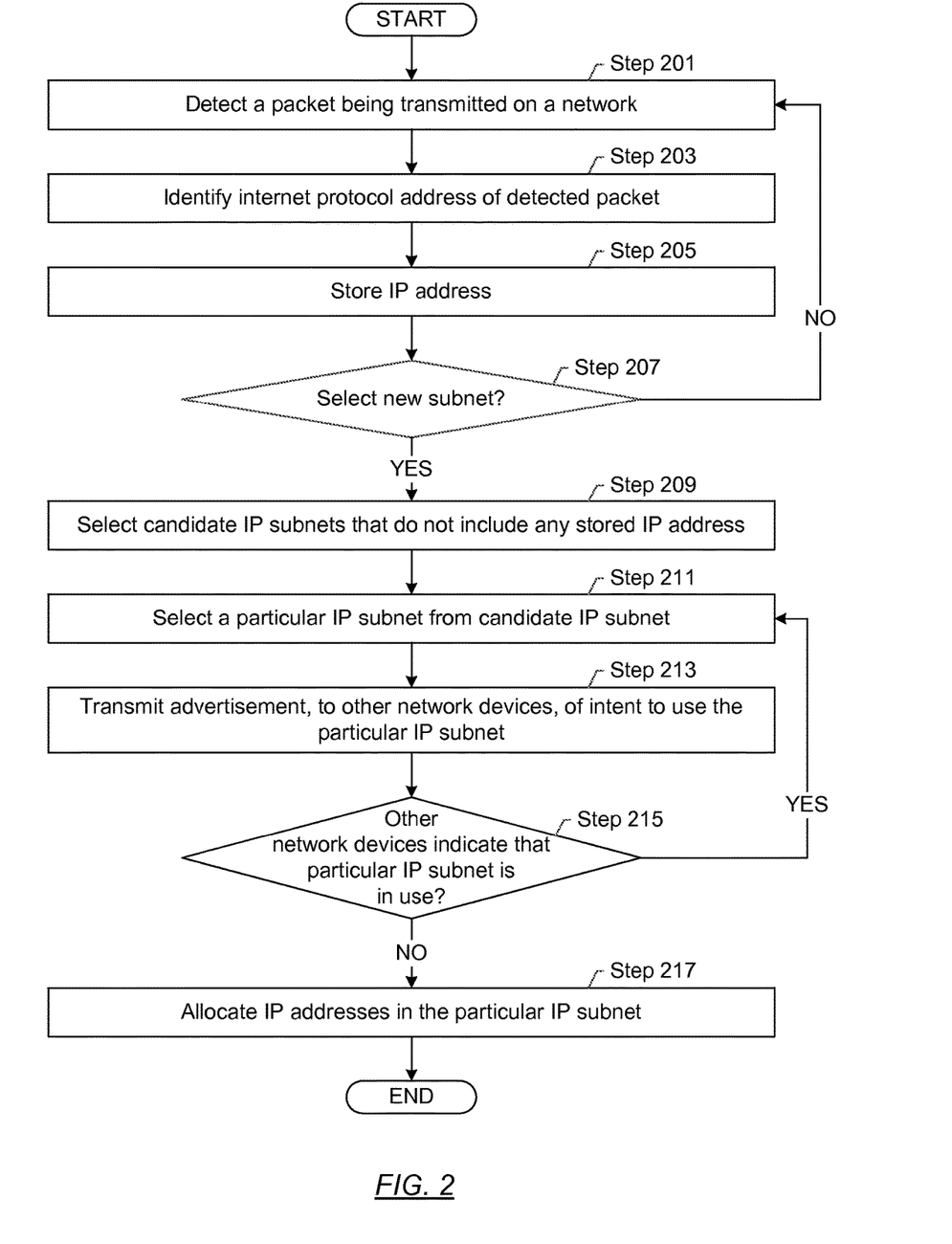
Figure 31:
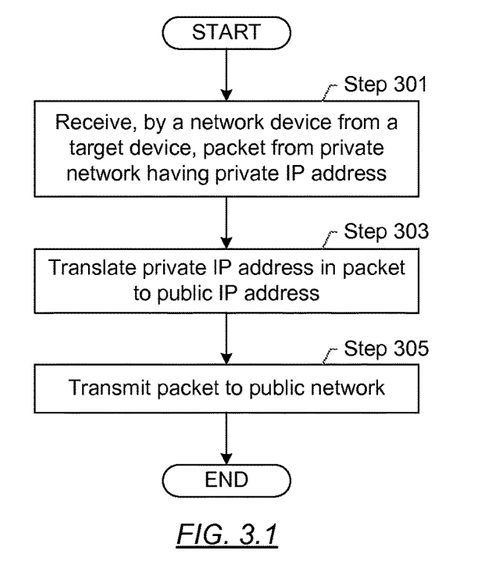
Figure 32:
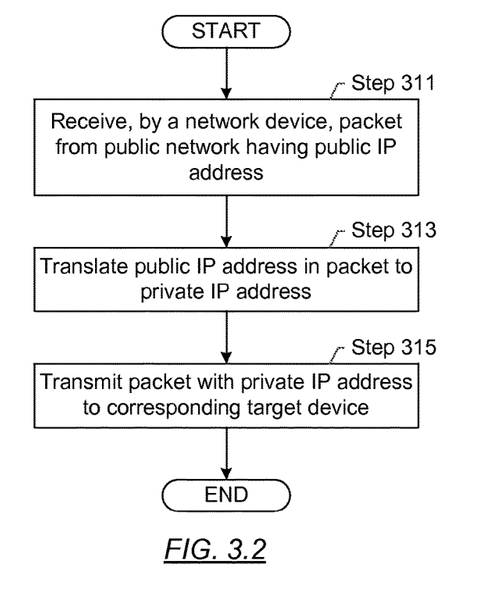

FIGS. 2, 3.1, and 3.2 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

FIG. 2 shows a flowchart for a network device to identify subnets and allocate addresses in accordance with one or more embodiments. In one or more embodiments, the steps in FIG. 2 may be performed by multiple network devices concurrently. Further, the number of network devices that perform address allocation may change depending on the number of devices in the system that requires addresses.

In Step 201, a network device detects a packet being transmitted on a network in accordance with one or more embodiments. Specifically, as packets are being transmitted on the network, the network device intercepts the packet, regardless of whether the network device is to perform any service on the packet, including forwarding service and translation services. In one or more embodiments, the network device may perform the interception continuously or only for a defined period of time prior to identifying a new IP subnet. For example, the network device may determine that the network device needs a new IP subnet and, based on the determination, start detecting packets on the network for the defined period of time. In one or more embodiments, the length of the defined period of time is configurable.

In Step 203, the network device identifies the IP address in the detected packet in accordance with one or more embodiments. In one or more embodiments, the IP address of the source of the packet (i.e., source IP address) is identified and/or the IP address of the destination of the packet (i.e., destination IP address) is identified. Although not shown in FIG. 2, the network device may determine which, if any, of the source IP address and destination IP address is in the private address space. The network device may then proceed with the IP address or IP addresses that are in the private address space.

In Step 205, the IP address is stored in one or more embodiments. In one or more embodiments, the network device stores the entire IP address. In other embodiments, the network device stores only an identifier of the IP subnet to which the IP address belongs. For example, the network device may store the entire subnet identifier (e.g., "192.168.1.0/24") or only the portion of the IP subnet that identifies the subnet from other subnets in the same IP address space (e.g., "1.0" in the case of the subnet being "192.168.1.0/24"). Rather than expressly storing the IP subnet, the network device may remove the IP subnet from a stored set of candidate IP subnets in one or more embodiments. The above are only a limited number of techniques for maintaining information about which subnets are available and which are not based on snooping packets. Other techniques may be used without departing from the scope of the claims.

In Step 207, a determination is made whether to select a new subnet for allocating IP addresses in accordance with one or more embodiments. For example, a network device may newly be offering the address allocation service, such as because of an overload of the current network capabilities. By way of another example, the network device may not have any more IP addresses available or have less than a threshold number of IP addresses available in the IP subnets that the network device is currently using. If the network device is newly offering the address allocation service, does not have any more IP addresses available, or has less than a threshold number of IP addresses available, then the determination may be made to select a new subnet and the method may proceed with Step 209 (discussed below). Alternatively, if the determination is made not to select a new subnet, then the process may continue with detecting packets and storing information about which subnets are in use.

If a determination is made to select a new subnet, then, in Step 209, candidate IP subnets that do not include any store IP address are selected in accordance with one or more embodiments. In one or more embodiments, the network device may iterate through each stored IP address corresponding to detected packets and determine which IP subnets are not in use in the network, which become the candidate IP subnets.

In one or more embodiments, in Step 211, a particular IP subnet is selected from the candidate IP subnets. The particular IP subnet may be the next available IP subnet in the candidate IP subnets, a randomly selected IP subnet in the candidate IP subnets, or selected based on another criteria. At this stage, the network device starts allocating addresses from the particular IP subnet without performing additional conflict checking. Alternatively, the network device may perform additional conflict checking as shown in FIG. 2.

In Step 213, an advertisement is transmitted to other network devices of the intent to use the particular IP subnet. Specifically, the network device sends a message to each of the other network devices that the network device will start using the IP subnet. In one or more embodiments, the message may be a broadcast message, a multicast message, or multiple point-to-point messages. Further, the advertisement may be sent to all other network devices or only to the other network devices that are providing address allocation services.

In Step 215, a determination is made whether the other network devices indicate that the particular IP subnet is in use. The other network devices may indicate that a particular IP subnet is in use when the other network devices respond with a conflict. Otherwise, the network device may assume that the particular IP subnet is not in use if the network device does not receive a response within a specified period of time. In other embodiments, the network device waits until a message is received from every other network device indicating whether the other network device is using the particular IP subnet.

If another network device is using the particular IP subnet, then the network device selects a different particular IP subnet from the candidate IP subnets. In other words, the flow may repeat with Step 211.

If the network device determines that no other network device is using the particular IP subnet, then the network device allocates IP addresses in the particular IP subnet in Step 217. Specifically, each target device that requests an IP address from the network device is allocated an unused IP address in the particular IP subnet. Because the network device has confirmed that no other network device is allocating addresses from the particular IP subnet, the IP address allocated is unique in the private network.

Once an IP address is allocated, a target device may begin using the IP address. In order to communicate with computing systems in the public network, the private IP address needs to be translated.

FIG. 3.1 shows a flowchart for translating the IP address in one or more embodiments. Specifically, the steps performed in FIG. 3.1 may be performed concurrently by multiple network devices that have address translation service providers.

In Step 301, the network device receives, from a target device, a packet via a private network having a private IP address in one or more embodiments. Specifically, the packet may be received directly or indirectly from the target device. Further, the packet has a private IP address of the target device in one or more embodiments.

In Step 303, the network device translates the private IP address in the packet to a public IP address in one or more embodiments. In one or more embodiments, the public IP address is a public IP address used by multiple, and potentially all, target devices. In one or more embodiments, the network device replaces the private IP address with the public IP address. Further, the network device may store state information in order to identify the correct private IP address when a response is received. In one or more embodiments, the network device may perform NAT processing of the message. In one or more embodiments, Step 303 is performed independently of the processing by other network devices.

In Step 305, the network device transmits the packet to the public network in one or more embodiments. In other words, the network device sends the packet with the public IP address for a source address to the network. The transmission may be direct or indirect, such as through one or more other network devices in the private network.

In one or more embodiments, one or more devices in the public network may send packets to target devices in the private network using the public IP address. FIG. 3.2 shows a flowchart for performing address translation to a private IP address from the public IP address. The steps performing in FIG. 3.2 may be performed by multiple network devices concurrently.

In Step 311, a network device receives a packet, having a public destination IP address from the public network in one or more embodiments. In one or more embodiments, the packet is directed to one of the target devices connected to the network device. Further, the network device may receive the packet directly or indirectly.

In Step 313, the network device translates the public IP address in the packet to a private IP address. In one or more embodiments, the network device identifies the target network that is the destination of the packet. The identification of the target device may be performed using state information stored for the communication session and other information. Based on the identification, the network device changes the public destination IP address in the packet to the private IP address of the target device. In one or more embodiments, the network device implements NAT processing to perform the translation.

In Step 315, the network device transmits the packet with the private IP address to the corresponding target device in accordance with one or more embodiments. Specifically, the network device may transmit the packet directly or indirectly to the target device.

Although not shown in FIG. 3, in some embodiments a client may roam from one network device to another network device. The following is a description of performing NAT processing when a client roams in accordance with one or more embodiments. In one or more embodiments, the network device that assigns the IP address to the client may be marked as the home network device for the client. In some embodiments, whenever the client roams, the home network device information is transferred with the session update as part of L2 roaming update with session update. Alternatively or additionally, if a mapping of the issued subnets to each network device is maintained at each network device, then the IP address may be derived from the mapping and used to find the home network device. Regardless of whether a mapping is used, one or more embodiments perform the NAT processing for the client on the home network device without regard to which network device the client is currently associated. In one or more embodiments, the NAT processing on the home network device ensures that outbound session from the SWARM (or network) for the particular network device has NAT processing through the home network device.

In one or more embodiments, as the client's network traffic is forwarded to home network device from the Visiting network device, the reverse route is updated at the home network device. If the home network device information is transferred with the session update, the reverse session remains intact even if the client roams again. In one or more embodiments, the home network device may be updated whenever the client roams so that the NAT processing for the client is performed by the home network device.

Figure 41:
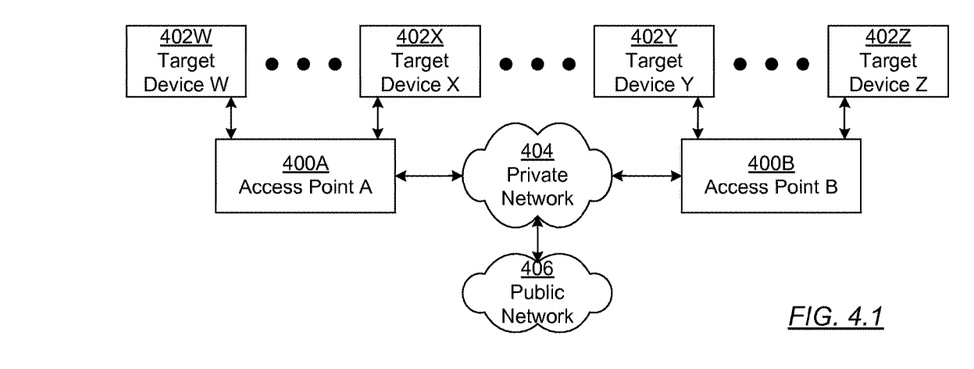
Figure 42:
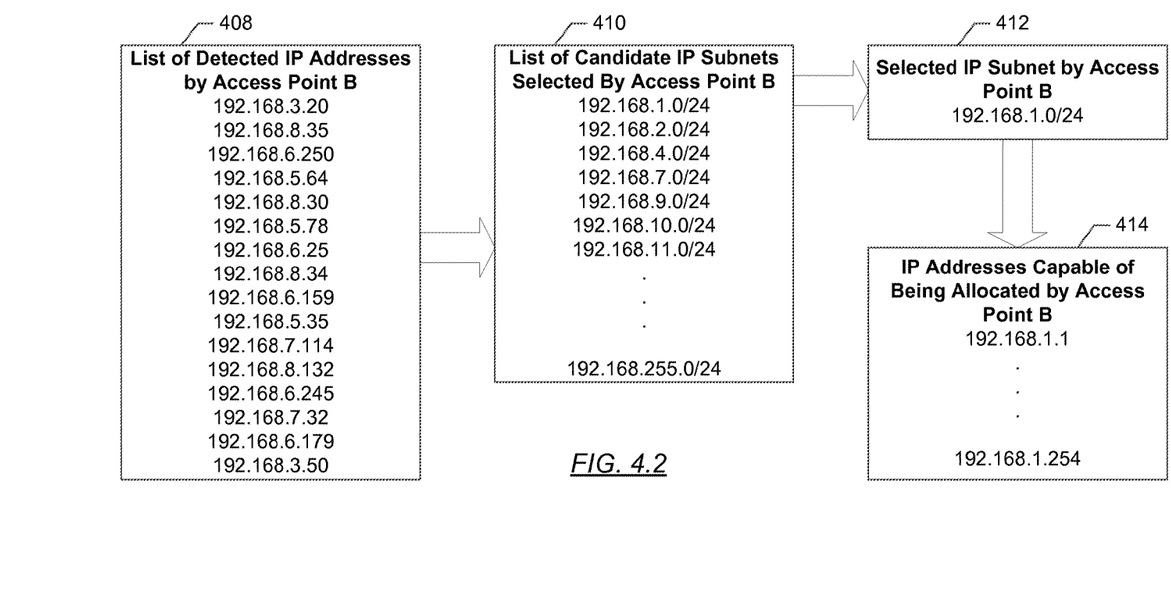

FIGS. 4.1 and 4.2 show an example in accordance with one or more embodiments. The following example is for explanatory purposes only and not intended to limit the scope. FIG. 4.1 shows an example system in accordance with one or more embodiments. In the example system, access point A (400A) and access point B (400B) each provide DHCP services. Multiple target devices (e.g., target device W (402W), target device X (402X), target device Y (402Y), target device Z (402Z)) are associated with the access points (e.g., access point A (400A), access point B (400B)) in the example. In other words, the target devices are directly connected to the access points and use the access points to connect to the private network (404) and, subsequently, the public network (406).

In the example, consider the scenario in which access point A (400A) and other access points (not shown) are providing DHCP services to the target devices associated with the respective access point. Further, access point B is going to start providing the DHCP service to target devices that connect to access point B.

FIG. 4.2 shows an example flow data diagram for access point B (400B) to select a particular IP subnet and allocate IP addresses from the IP subnet. In the example, the access points allocate IP addresses from the 192.168.0.0/24 private address space. In the 192.168.0.0/24, the first 24 bits are static and the remaining bits may change to create different IP addresses. In other words, the IP address space is 192.168.1.1 to 192.168.255.255. Further, in the example, from the IP address space, different subnets may be created having IP addresses 192.168.X.0 to 192.168.X.255, where X is a constant value for the subnet.

Continuing with the example, during an initial length of time, access point B detects packets transmitted on the private network. When access point detects a packet, access point B extracts the private IP address, which may be the source or destination IP address, from the packet and adds the private IP address to the list of detected IP addresses by access point B (408). From the list of detected IP addresses (408), access point B determines which subnets are not in use and creates a list of candidate IP subnets created by access point B (410). For example, as shown in FIG. 4.2, because IP address 192.168.3.20 is in the list of detected IP addresses, the subnet 192.168.3.0/24 is not available. However, because no packet is detected in the IP subnet 192.168.1.0/24, IP subnet 192.168.1.0/24 is available and is in the list of candidate IP subnets created by access point B (410).

From the list of candidate IP subnets, access point B selects the particular IP subnet (412) to be 192.168.1.0/24. At this stage, access point B may optionally advertise the intent to use IP subnet 192.168.1.0/24. If no other access point responds in the example, then access point B starts allocating addresses from the 192.168.1.0/24 IP subnet. The IP addresses that are capable of being allocated to target devices by access point B (414) now include 192.168.1.1 to 192.168.1.255. In one or more embodiments, all target devices that are associated with access point B are allocated an IP address from the 192.168.1.0/24 IP subnet by access point B. Because multiple access points are capable of allocating IP addresses, the system is not slowed by too many target devices requesting the service from a centralized device.

While the invention has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A non-transitory computer readable medium comprising instructions which, when executed by one or more hardware processors, cause performance of operations comprising:
   detecting, by a first network device of a plurality of network devices, a plurality of detected packets;
   identifying a plurality of Internet Protocol (IP) addresses corresponding to the plurality of detected packets;
   storing a plurality of utilized IP subnets used by a second network device of the plurality of network devices;
   creating a list of candidate IP subnets that are not being utilized by the second network device utilizing the stored plurality of utilized IP subnets, wherein creating the list of candidate IP subnets comprises creating at least a new IP address for a target device to be addressed by an IP subnet in the list of candidate IP subnets;
   selecting a particular candidate IP subnet from the list of candidate IP subnets for allocation by the first network device to the target device;
   transmitting from the first network device to a subset of the plurality of network devices, an advertisement comprising an intent of the first network device to allocate IP addresses from the particular candidate IP subnet to the target device;
   selecting, by a first access point, the particular candidate IP subnet for allocating to a respective set of target devices associated with the first access point;
   maintaining, at the first access point, a mapping of IP subnets issued to a plurality of access points; and
   identifying, based on the mapping of IP subnets, at a second access point, the first access point as a home network device of the target device when roaming to the second access point.

2. The non-transitory computer readable medium of claim 1, further comprising instructions for: allocating, by the first network device, at least one IP address in the particular IP subnet to a target device in the target device served by the first network device.

3. The non-transitory computer readable medium of claim 1, wherein creating a list of candidate IP subnets comprises:
   selecting a private IP address space that is not being used for communication by the second network device with other network devices of the plurality of network devices; and
   creating the list of candidate IP subnets from the private IP address space that is not being used for communication by the second network device with other network devices of the plurality of network devices.

4. The non-transitory computer readable medium of claim 3, wherein the private IP address space is selected from one of three private IP address spaces comprising: 10.0.0.0/8, 172.16.0.01/2, and 192.168.0.0/16.

5. The non-transitory computer readable medium of claim 1, further comprising instructions for:
confirming, by the first network device, that the particular candidate IP subnet is not being used by a plurality of other network devices.

6. The non-transitory computer readable medium of claim 5, wherein determining that the particular candidate IP subnet is not being used by a plurality of other network devices comprises:
determining, by the first network device, that none of the plurality of network devices is newly offering an address allocation service based on a lack of response.

7. The non-transitory computer readable medium of claim 1, wherein the first network device is an access point, wherein the access point is configured for connecting to the target device.

8. The non-transitory computer readable medium of claim 1,
wherein the first network device is an access point, and wherein all target devices associated with the access point are assigned an IP address from the particular candidate IP subnet.

9. The non-transitory computer readable medium of claim 1, wherein each network device, of the plurality of network devices, selects a respective IP subnet, and assigns IP addresses from the respective IP subnet to target devices served by that network device.

10. The non-transitory computer readable medium of claim 1, wherein detecting the plurality of detected packets comprises detecting the plurality of detected packets on an IP subnet used for communication between the second network device and other network devices of the plurality of network devices on a same private network.

11. The non-transitory computer readable medium of claim 1, wherein the first network device serves as a Network Address Translation (NAT) device for packets (a) received from the target device with IP addresses in the particular candidate IP subnet and (b) transmitted on a public network.

12. A non-transitory computer readable medium comprising instructions which, when executed by one or more hardware processors, cause performance of operations comprising:
detecting, by a first network device, a plurality of detected packets;
determining, a plurality of source Internet Protocol (IP) addresses and a plurality of destination IP addresses corresponding to the plurality of detected packets;
determining a portion of the plurality of source IP addresses that are in a private IP address space and a portion of the plurality of destination IP addresses that are in the private IP address space;
determining a plurality of utilized IP subnets used by a second network device from the portion of the plurality of source IP addresses that are in the private IP address space and from the portion of the plurality of destination IP addresses;
storing the plurality of utilized IP subnets used by a second network device derived from the plurality of detected packets;
creating a list of candidate IP subnets that are not being utilized by the second network device utilizing the stored plurality of utilized IP subnets, wherein creating the list of candidate IP subnets comprises creating at least a new IP address for a target device to be addressed by an IP subnet in the list of candidate IP subnets;
selecting a particular candidate IP subnet from the list of candidate IP subnets for allocation by the first network device;
transmitting, by the first network device to a plurality of other network devices an advertisement comprising an intent to use the particular candidate IP subnet;
selecting, by a first access point, the particular candidate IP subnet for allocating to a respective set of target devices associated with the first access point;
maintaining, at the first access point, a mapping of IP subnets issued to each of a plurality of access points; and
identifying, based on the mapping of IP subnets, at a second access point, the first access point as a home network device of the target device when roaming to the second access point.

13. The non-transitory computer readable medium of claim 12, further comprising instructions for: allocating, by the first network device, a plurality of IP addresses in the particular candidate IP subnet to the target device served by the first network device.

14. The non-transitory computer readable medium of claim 12, wherein the first network device is an access point, and wherein the target device comprises a plurality of target devices associated with the access point.

15. The non-transitory computer readable medium of claim 12, wherein creating a list of candidate IP subnets comprises:
selecting the private IP address space that is not being used for communication by the second network device with the plurality of other network devices; and
creating the list of candidate IP subnets from the private IP address space that is not being used for communication by the second network device with the plurality of other network devices.

16. The non-transitory computer readable medium of claim 12, wherein determining that no other network devices are using the particular candidate IP subnet comprises: determining that no messages are received from the plurality of other network devices in response to the advertisement.

17. The non-transitory computer readable medium of claim 12, wherein each network device, of a plurality of network devices comprising the first network device and the plurality of other network devices, selects a respective candidate IP subnet, and assigns IP addresses from the respective candidate IP subnet to the target device served by that network device.

18. A non-transitory computer readable medium comprising instructions which, when executed by one or more hardware processors, cause performance of operations comprising:
detecting, by a first access point a plurality of detected packets;
identifying, by the first access point, a plurality of Internet Protocol (IP) addresses corresponding to the plurality of detected packets;
storing, by the first access point, a plurality of utilized IP subnets used by a second access point, derived from the plurality of IP addresses;

creating, by the first access point, a list of candidate IP subnets that are not being utilized by a second access point utilizing the plurality of utilized IP subnets, wherein creating the list of candidate IP subnets comprises creating at least a new IP address for a target device to be addressed by an IP subnet in the list of candidate IP subnets;

selecting, by each particular the first access point, responsive to a determination that the first access point is newly offering an address allocation service because of an overload, a candidate IP subnet from the list of candidate IP subnets for allocation to the target device; and transmitting, from the first access point to the second access point, an advertisement of an intent to use the candidate IP subnet;

selecting, by a first access point, a particular candidate IP subnet for allocating to a respective set of target devices associated with the first access point;

maintaining, at the first access point, a mapping of IP subnets issued to each of a plurality of access points; and identifying, based on the mapping of IP subnets, at a second access point, the first access point as a home network device of the target device when roaming to the second access point.

19. The non-transitory computer readable medium of claim 18, wherein the first access point serves as a Network Address Translation (NAT) device for packets:

(a) received from the target device with IP addresses in the IP subnet in the list of IP subnets; and (b) transmitted on a public network.

20. A non-transitory computer readable medium comprising instructions which, when executed by one or more hardware processors, cause performance of operations compromising:

detecting, by a first access point of a plurality of access points, a plurality of detected packets;

identifying a plurality of Internet Protocol (IP) addresses corresponding to the plurality of detected packets;

storing a plurality of utilized IP subnets derived from the identified plurality of IP addresses;

creating, by the first access point of the plurality of access points, a list of candidate IP subnets that are not being utilized by a second access point other than the first access point, utilizing the stored plurality of utilized IP subnets, wherein creating the list of candidate IP subnets comprises creating at least a new IP address for a target device to be addressed by an IP subnet in the list of candidate IP subnets;

selecting, by the first access point a respective candidate IP subnet from the list of candidate IP subnets;

transmitting, by a second access point, an advertisement comprising an intent to use the respective candidate IP subnet;

responsive to determining that none other than the first access point is using the respective candidate IP subnet: selecting, by the first access point, the respective candidate IP subnet for allocating to a respective set of target devices associated with the first access point;

maintaining, at each of the plurality of access points, a mapping of IP subnets issued to each of the plurality of access points; and identifying, based on the mapping of IP subnets, at a second access point of the plurality of access points, the first access point as a home network device of the target device when roaming to the second access point.

\* \* \* \* \*